Figure 1:
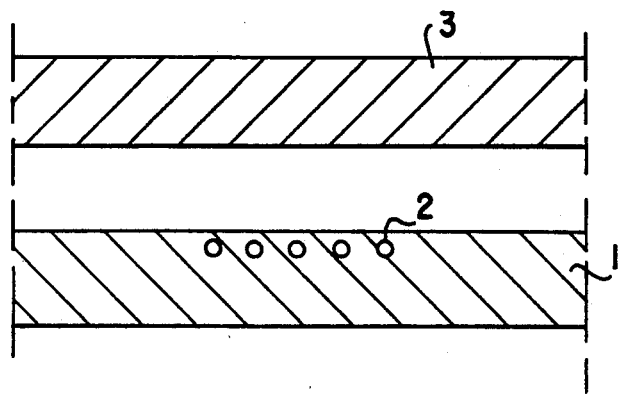

United States Patent [19]

Suontausta et al.

[11] Patent Number: 5,243,193
[45] Date of Patent: Sep. 7, 1993

[54] DETECTION MATERIAL FOR IONIZING RADIATION

[75] Inventors: Jari Suontausta, Raisio; Timo Oikari, Turku, both of Finland

[73] Assignee: Wallac Oy, Turku, Finland

[21] Appl. No.: 778,945

[22] PCT Filed: Jun. 19, 1990

[86] PCT No.: PCT/FI90/00162
§ 371 Date: Dec. 17, 1991
§ 102(e) Date: Dec. 17, 1991

[87] PCT Pub. No.: WO90/16002
PCT Pub. Date: Dec. 27, 1990

[30] Foreign Application Priority Data

Jun. 19, 1989 [FI] Finland .................. 892980

[51] Int. Cl.$^5$ .................. G01T 1/203; C09K 11/06
[52] U.S. Cl. .................. 250/361 R; 250/483.1; 252/301.17; 252/301.35; 252/301.33; 252/301.36

[58] Field of Search .................. 252/301.17, 301.35, 252/301.33, 301.36; 250/361 R, 483.1

[56] References Cited

U.S. PATENT DOCUMENTS

| 2,745,967 | 5/1956 | Ludeman | 252/301.17 |
| 3,457,180 | 7/1969 | Kretz et al. | 252/301.17 |
| 3,853,584 | 12/1974 | Tatsuta et al. | 427/223 |
| 4,375,423 | 3/1983 | Cusano et al. | 252/301.36 |
| 5,155,364 | 10/1992 | Fijii | 250/361 |

Primary Examiner—Prince Willis, Jr.
Assistant Examiner—Alan D. Diamond
Attorney, Agent, or Firm—Shea & Gould

[57] ABSTRACT

A detection material for ionizing radiation. The material is solid at room temperature but meltable to a fluid at a temperature of about 100° C. One essential component in said detection material is a low molecular weight aromatic polymer, preferably a thermoplastic resin that contains low molecular weight polymer molecules of styrene and/or styrene derivatives. The detection material optionally contains a hot melt polymer and a wax-like substance, such as paraffin.

8 Claims, 1 Drawing Sheet

DETECTION MATERIAL FOR IONIZING RADIATION

The object of the invention is a detection material for ionizing radiation, having at least one organic and/or inorganic scintillating compound and primarily intended for detecting radioactive samples that reside on a support material. The detection material is intended for detecting ionizing radiation in an arrangement where radioactive samples situate on a measurement support, such as a filter plate or alike, and into which detection material, such as scintillator, is added before the measurement.

The invention relates in the first place to liquid scintillation counting from a filter plate. A liquid scintillation counter of this type is e.g. that manufactured by the applicant Wallac Oy with the trade name 1205 Betaplate. With this instrument, samples labeled with radioactive markers are measured that situate on a filter plate or on other corresponding plate. The size of the filter plate used by the applicant is 10 cm×25 cm. On the plate samples are positioned in 16 rows so that there are 6 samples in each row. The total number of samples on the plate is 96. Every sample situates on an area with the diameter of 9 mm.

According to a known method, the filter plate on which the samples to be investigated situate, is put into a flat plastic bag for the measurement, and about 10 ml of liquid scintillator is added. The bag is sealed e.g. with a heat sealer and is placed in a measuring cassette of 1205 Betaplate liquid scintillation counter. The liquid scintillator converts part of the radiation energy emitted by the samples into light that is measured with the photomultiplier tubes of the scintillation counter.

A drawback of this known method has been that in some cases the samples on the filter plate have been noticed to gradually dissolve into said liquid scintillator. If the samples then get mixed with each other, serious errors are introduced in the measurement.

The object of the present invention is to create a new detection material that is solid at room temperature and e.g. plate-shaped, but can be melted to fluid by heating it to a temperature of about +100 C whereby the material penetrates into the filter plate. The measurement is performed after the detection material has cooled and solidified.

The detection material according to the invention is characterized in that said detection material is solid at room temperature, but for bringing said detection material into intimate contact with said support material and radioactivity thereon, said detection material is optionally meltable to fluid by heating. One essential component in said detection material is a low molecular weight aromatic polymer, preferably a thermoplastic resin that contains low molecular weight polymer molecules of styrene and/or styrene derivatives.

The meltable detection material plate, or scintillator plate, according to the invention, removes the problem described above, because the samples do not dissolve into the solid scintillator plate.

The other characteristics of the invention are presented in the patent claims below.

In the following, detection material according to the invention and its use are described with the disclosed drawings where FIG. 1 presents the detection material plate and the filter plate on which the sample has been positioned.

Figure 2:
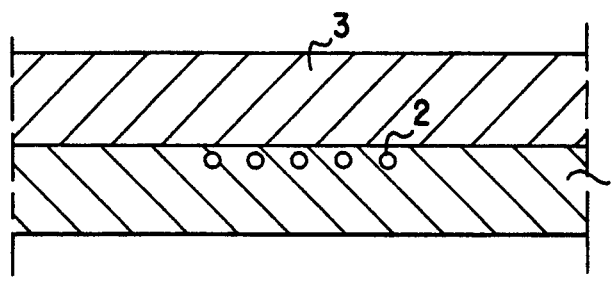

FIG. 2 presents the plates of FIG. 1 laid on each other.

Figure 3:
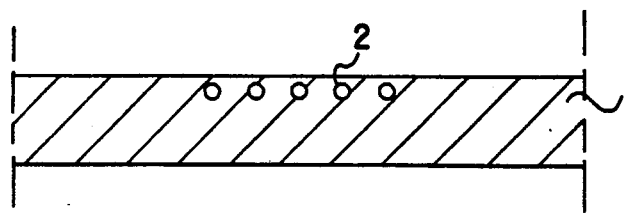

FIG. 3 presents the filter plate of FIG. 2 into which the detection material plate has been melted.

The scintillator plate made of the detection material according to the invention is used e.g. in the following way:

The filter plate 1, on which the samples 2 to be investigated situate, is put into a flat plastic bag into which also the solid scintillator plate 3 is added that is of the same size as the filter plate. The thickness of the scintillator plate is e.g. 0.2–2 mm. After this, the solid scintillator plate 3 is melted into the porous filter plate 1 with e.g. a hot metal plate. During the melting period the liquid formed by the material of the scintillator plate penetrates so near the radiation emitting sample molecules that the radiation and the material of the scintillator plate can interact.

After melting, the system is cooled down to room temperature where the material of the scintillator plate is solid again and the samples can not, therefore, dissolve into it. As a result of interaction processes, part of the radiation energy emitted by the radioactive molecules is converted to light that is measured with the mentioned liquid scintillation counter.

According to the invention, it has been found that suitable to one very useful component in the meltable detection material is a thermoplastic resin that contains low molecular weight polymer molecules of styrene and/or styrene derivatives.

The mentioned styrene derivatives are e.g. α-methylstyrene, vinyltoluene, dimethylstyrene, dimethyl-α-methylstyrene and tertiary butylstyrene. Trade names of such resins are e.g. Piccotex, Kristalex and Nevbrite.

Low molecular weights of the mentioned resins are essential for meltability. Previously known in the art are high molecular weight polystyrene and polyvinyltoluene that have been employed as base polymers in so called plastic scintillators. However, these are not easily meltable to fluid.

Furthermore, it has been found that suitable to second useful component in the detection material is a polymer for hot melt adhesives (hot melt polymer) that gives elasticity for the material at room temperature. Constitutional units of hot melt polymers are e.g. ethylenevinylacetate (EvA), ethylene-ethylacrylate (EEA) and ethylenebutylacrylate (EBA).

As a third component in the detection material, the actual scintillating compounds are used that are previously known in the art. Organic scintillating compounds are e.g. diphenyloxazole (PPO), phenylbiphenyloxadiazole (PBD), bis(phenyloxazolyl)benzene (POPOP) and bis(methylstyryl)benzene (bis-MSB). The usefulness of the above mentioned resins, inventors assume, arises from the fact that they contain aromatic groups that can transfer the excited states generated by radiation to the mentioned organic scintillating compounds. For special applications, inorganic scintillating compounds can also be adopted that are e.g. zincsulphide and yttriumsilicates activated with appropriate impurity atoms.

As an additional component in the detection material, paraffin or another appropriate wax can be included to adjust the fluidity of the molten material.

Expressed as percentages by weight, the amounts of the mentioned components are 10–99.5% of the low molecular weight aromatic polymer; 0–60% of the hot melt polymer and 0–80% of the wax-like component.

The amounts of the components of an illustrative composition can be e.g. as follows: resin 60%, hot melt polymer 10%, scintillating compounds 5% and paraffin 25%. Naturally, the amounts can be varied, if needed.

A homogeneous mixture is obtained from the mentioned components by heating them to sufficiently high temperature, e.g. +100 C, and mixing them together. Of this mixture, scintillator plates with desired thicknesses and to be used as described above.

The invention can also be used in some other applications, such as in autoradiography, where, with the invention, the energy of the radiation can be converted to light that is allowed to expose photographic plate or film.

The invention is not confined to the presentation above, but it includes all meltable scintillator plates and bodies of other shapes that have as one component a thermoplastic resin that contains low molecular weight polymer molecules of styrene and/or styrene derivatives.

We claim:

1. A radioactive test plate comprising
   a measurement support,
   at least one radioactive sample disposed on the measurement support, and
   a detection material in contact with the measurement support and radioactive sample, the detection material comprising at least one scintillation compound and an aromatic, thermoplastic polymer that is a solid at room temperature and meltable at a temperature of about 100° C. or higher to form a liquid.

2. A radioactive test plate as define din claim 1, wherein the aromatic, thermoplastic polymer is a polymer of at least one of styrene and a styrene derivative.

3. A radioactive test plate as defined in claim 2, wherein the styrene derivative is a member of the group consisting of α-methyl-styrene, vinyl toluene, dimethylstyrene, dimethyl-α-methylstyrene, and t-butylstyrene.

4. A radioactive test plate as defined in claim 1 wherein the detection material further comprises a hot melt polymer.

5. A radioactive test plate as defined in claim 4, wherein the hot melt polymer is a member of the group consisting of polymers of ethylene vinylacetate, ethylene ethylacrylate, and ethylene butylacrylate.

6. A radioactive test plate as defined in claim 1, wherein the detection material comprises 10–99.5 per cent by weight of the aromatic, thermoplastic polymer, 0–60 per cent by weight of a hot melt polymer and 0–80 per cent by weight of a wax.

7. A radioactive test plate as defined in claim 6, wherein the wax is paraffin.

8. A method of preparing radioactive samples for testing comprising
   disposing at least one radioactive sample on a measurement support,
   disposing a detection material on the measurement support, the detection material comprising at least one scintillation compound and an aromatic, thermoplastic polymer, that is a solid at room temperature and meltable at a temperature of about 100° C. or higher to form a liquid,
   heating the detection material to form a liquid which permeates the measurement support and contacts the radioactive sample, and
   cooling the detection material and the measurement support.

* * * * *